US012706708B2

(12) United States Patent
Wang et al.

(10) Patent No.: US 12,706,708 B2
(45) Date of Patent: Aug. 11, 2026

(54) CSI MEASUREMENT RESOURCE PROCESSING METHOD AND APPARATUS, TERMINAL, AND READABLE STORAGE MEDIUM

(71) Applicant: VIVO MOBILE COMMUNICATION CO., LTD., Guangdong (CN)

(72) Inventors: Chenxi Wang, Guangdong (CN); Peng Sun, Guangdong (CN); Yu Yang, Guangdong (CN); Rakesh Tamrakar, Guangdong (CN); Yang Song, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 354 days.

(21) Appl. No.: 18/506,594

(22) Filed: Nov. 10, 2023

(65) Prior Publication Data

US 2024/0080148 A1 Mar. 7, 2024

Related U.S. Application Data

(63) Continuation of application No. PCT/CN2022/090975, filed on May 5, 2022.

(30) Foreign Application Priority Data

May 10, 2021 (CN) ......................... 202110507881.6

(51) Int. Cl.
*H04L 5/00* (2006.01)
*H04B 7/06* (2006.01)

(52) U.S. Cl.
CPC ....... *H04L 5/0035* (2013.01); *H04B 7/06966* (2023.05); *H04L 5/0048* (2013.01)

(58) Field of Classification Search
None
See application file for complete search history.

(56) References Cited

U.S. PATENT DOCUMENTS 11,006,303 B2 * 5/2021 Yum ..................... H04W 72/21
2015/0155996 A1 6/2015 Garcia
(Continued)

FOREIGN PATENT DOCUMENTS

CN 108933648 A 12/2018
CN 110612734 A 12/2019
(Continued)

OTHER PUBLICATIONS

Second Japanese Office Action for Japanese Patent Application No. 2023-569964 mailed Apr. 1, 2025. 8 pages.
(Continued)

*Primary Examiner* — Phirin Sam
(74) *Attorney, Agent, or Firm* — BROOKS KUSHMAN P.C.

(57) ABSTRACT

A CSI measurement resource processing method and apparatus, a terminal, and a readable storage medium. The CSI measurement resource processing method in embodiments of this application includes: performing, by a terminal, a first processing operation on a first measurement resource based on configuration information configured by a network-side device; and reporting, by the terminal, a processing result of the first processing operation, where the first measurement resource includes one or multiple CSI measurement resources, the configuration information includes an association relationship between the CSI measurement resources and multiple transmission and reception points TRPs or cells, and the first processing operation includes at least one of the following: channel measurement and interference measurement.

20 Claims, 7 Drawing Sheets

A terminal performs a first processing operation on a first measurement resource based on configuration information configured by a network-side device — 502

↓

The terminal reports a processing result of the first processing operation — 504

(56) References Cited

U.S. PATENT DOCUMENTS

| | | | | |
|---|---|---|---|---|
| 2018/0175992 | A1* | 6/2018 | Fröberg Olsson | H04L 5/0094 |
| 2019/0036569 | A1* | 1/2019 | Deng | H04B 7/063 |
| 2019/0044639 | A1* | 2/2019 | Ouchi | H04W 72/23 |
| 2019/0230549 | A1* | 7/2019 | Wang | H04B 7/0639 |
| 2019/0261347 | A1* | 8/2019 | Harada | H04W 88/02 |
| 2019/0297519 | A1 | 9/2019 | Han et al. | |
| 2019/0334601 | A1 | 10/2019 | Han et al. | |
| 2019/0349101 | A1* | 11/2019 | Takeda | H04W 24/08 |
| 2020/0044806 | A1* | 2/2020 | Jassal | H04L 5/0094 |
| 2020/0053738 | A1 | 2/2020 | Harada et al. | |
| 2020/0076490 | A1 | 3/2020 | Onggosanusi et al. | |
| 2020/0112864 | A1* | 4/2020 | Lee | H04W 72/541 |
| 2020/0169374 | A1* | 5/2020 | Qi | H04B 7/024 |
| 2020/0169993 | A1* | 5/2020 | Kim | H04L 5/005 |
| 2020/0229013 | A1* | 7/2020 | Kim | H04B 7/0478 |
| 2020/0351800 | A1* | 11/2020 | Imamura | H04J 11/0053 |
| 2020/0389883 | A1 | 12/2020 | Faxer et al. | |
| 2021/0028984 | A1 | 1/2021 | Da Silva et al. | |
| 2021/0167830 | A1 | 6/2021 | Song et al. | |
| 2021/0289379 | A1* | 9/2021 | Zhang | H04W 24/10 |
| 2021/0337415 | A1* | 10/2021 | Chen | H04B 7/0626 |
| 2021/0391932 | A1* | 12/2021 | Takeda | H04B 7/0456 |
| 2022/0224470 | A1 | 7/2022 | Matsumura et al. | |
| 2022/0240120 | A1 | 7/2022 | Fan et al. | |
| 2022/0286175 | A1 | 9/2022 | Matsumura et al. | |
| 2023/0122910 | A1* | 4/2023 | Li | H04W 52/243<br>370/329 |
| 2023/0254712 | A1 | 8/2023 | Li | |
| 2026/0040106 | A1* | 2/2026 | Hua | H04L 5/0094 |

FOREIGN PATENT DOCUMENTS

| | | | |
|---|---|---|---|
| CN | 110831196 | A | 2/2020 |
| CN | 111416644 | A | 7/2020 |
| CN | 112087291 | A | 12/2020 |
| CN | 112119597 | A | 12/2020 |
| CN | 112672378 | A | 4/2021 |
| JP | 2017502578 | A | 1/2017 |
| WO | 2018173232 | A1 | 9/2018 |
| WO | 2019096255 | A1 | 5/2019 |
| WO | 2020025010 | A1 | 2/2020 |
| WO | 2020059146 | A1 | 3/2020 |
| WO | 2020092468 | A1 | 5/2020 |
| WO | 2020222279 | A1 | 11/2020 |
| WO | 2020235456 | A1 | 11/2020 |
| WO | 2021016809 | A1 | 2/2021 |
| WO | 2021033220 | A1 | 2/2021 |

OTHER PUBLICATIONS

First Office Action for Chinese Application No. 202110507881.6, dated Sep. 1, 2023, 11 Pages.

Spreadtrum Communications "Discussion on CSI enhancement for multiple TRP/Panel transmission" 3GPP TSG RAN WG1 #98, Prague, CZ, Aug. 2019, R1-1908961, 4 Pages.

Spreadtrum Communications "Discussion on CSI enhancement for multiple TRP/Panel transmission" 3GPP TSG RAN WG1#102-e, e-Meeting, Aug. 2020, R1-2006262, 4 Pages.

Nokia, Nokia Shanghai Bell "Enhancements on Beam Management for Multi TRP/ Panel Transmission" 3GPP TSG RAN WG1 #104-e Meeting, e-Meeting, Jan. 2021, R1-2101008, 11 Pages.

Second Office Action for Chinese Application No. 202110507881.6, dated Mar. 8, 2024, 10 Pages.

International Search Report and Written Opinion for Application No. PCT /CN2022/090975, dated Jul. 28, 2022, 7 Pages.

Huawei, HiSilicon "CSI measurement enhancement for multi TRP/ panel transmission" 3GPP TSG RAN WG1 Meeting #96bis, Xi'an, China, Apr. 2019, R1-1903982, 6 Pages.

Extended European Search Report for Application No. 22806588.4, dated Oct. 14, 2024, 8 Pages.

First Office Action for Japanese Application No. 2023-569964, dated Oct. 8, 2024, 8 Pages.

ZTE "CSI enhancements for Multi-TRP and FR1 FDD reciprocity" 3GPP TSG RAN WG1 #104-e, e-Meeting, Jan. 2021, R1-2100291, 15 Pages.

Huawei, HiSilicon, China Unicom "Discussion on CSI Enhancements for Rel-17" 3GPP TSG RAN WG1 Meeting #104bis-e, E-meeting, Apr. 2021, R1-2102339, 19 Pages.

OPPO "CSI enhancements for M-TRP and FR1 FDD reciprocity" 3GPP TSG RAN WG1 #104b-e, e-Meeting, Apr. 2021, R1-2102384, 9 Pages.

Ericsson "CSI enhancements for Multi-TRP and FR1 FDD reciprocity" 3GPP TSG-RAN WG1 Meeting #104-bis, Online, Apr. 2021, R1-2103543, 17 Pages.

* cited by examiner

CSI MEASUREMENT RESOURCE PROCESSING METHOD AND APPARATUS, TERMINAL, AND READABLE STORAGE MEDIUM

CROSS-REFERENCE TO RELATED APPLICATIONS

This application is a continuation of International Application No. PCT/CN2022/090975 filed on May 5, 2022, which claims priority to Chinese Patent Application No. 202110507881.6 filed on May 10, 2021, which are incorporated herein by reference in their entireties.

TECHNICAL FIELD

This application pertains to the field of communications technologies, and in particular, relates to a CSI measurement resource processing method and apparatus, a terminal, and a readable storage medium.

BACKGROUND

Currently, when performing inter-cell (inter-cell) multi transmission and reception point (Multi-Transmission and Reception Points, MTRP) beam measurement and channel state information (Channel State Information, CSI) measurement, user equipment (User Equipment, UE) is unable to distinguish from which cell a synchronization signal and physical broadcast channel block (Synchronization Signal and Physical Broadcast Channel Block, SSB) or a channel state information reference signal (Channel State Information Reference Signal, CSI-RS) comes. Consequently, content reported by the UE may come from a same cell, and this is disadvantageous to carrier aggregation (Carrier Aggregation, CA) and UE movement.

SUMMARY

Embodiments of this application provide a CSI measurement resource processing method and apparatus, a terminal, and a readable storage medium, to resolve a problem in the prior art that content reported by a terminal comes from a same cell because the terminal is unable to distinguish from which cell an SSB or a CSI-RS comes.

According to a first aspect, a channel state information CSI measurement resource processing method is provided. The method includes: performing, by a terminal, a first processing operation on a first measurement resource based on configuration information configured by a network-side device; and reporting, by the terminal, a processing result of the first processing operation, where the first measurement resource includes one or multiple CSI measurement resources, the configuration information includes an association relationship between the CSI measurement resources and multiple transmission and reception points TRPs or cells, and the first processing operation includes at least one of the following: channel measurement and interference measurement.

According to a second aspect, a CSI measurement resource processing apparatus is provided. The apparatus includes: a first execution module, configured to perform a first processing operation on a first measurement resource based on configuration information configured by a network-side device; and a first reporting module, configured to report a processing result of the first processing operation, where the first measurement resource includes one or multiple CSI measurement resources, the configuration information includes an association relationship between the CSI measurement resources and multiple transmission and reception points TRPs or cells, and the first processing operation includes at least one of the following: channel measurement and interference measurement.

According to a third aspect, a terminal is provided. The terminal includes a processor, a memory, and a program or instructions stored in the memory and capable of running on the processor. When the program or instructions are executed by the processor, the steps of the method according to the first aspect are implemented.

According to a fourth aspect, a terminal is provided. The terminal includes a processor and a communications interface. The processor is configured to perform a first processing operation on a first measurement resource based on configuration information configured by a network-side device. The communications interface is configured to report a processing result of the first processing operation.

According to a fifth aspect, a readable storage medium is provided. The readable storage medium stores a program or instructions. When the program or instructions are executed by a processor, the steps of the method according to the first aspect are implemented.

According to a sixth aspect, a chip is provided. The chip includes a processor and a communications interface. The communications interface is coupled to the processor. The processor is configured to run a program or instructions to implement the method according to the first aspect.

According to a seventh aspect, a computer program or a program product is provided. The computer program or program product is stored in a storage medium. The computer program or program product is executed by at least one processor to implement the steps of the method according to the first aspect.

According to an eighth aspect, a communications device is provided. The communications device is configured to perform the steps of the method according to the first aspect.

In the embodiments of this application, the terminal may perform the first processing operation on the CSI measurement resource based on the configuration information configured by the network-side device and including the association relationship between the CSI measurement resources and the multiple transmission and reception points TRPs or cells, and report the processing result of the first processing operation. Because the configuration information includes the association relationship between the CSI measurement resources and the multiple transmission and reception points TRPs or cells, the terminal can distinguish from which cell or which of the multiple TRPs the processing result comes, and report the processing result. In this way, a problem in the prior art that content reported by a terminal comes from a same cell because the terminal is unable to distinguish from which cell an SSB or a CSI-RS comes can be avoided. This not only facilitates high-speed data transmission of the terminal in carrier aggregation, but also improves reliability of data transmission during movement of the terminal.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (Long Term Evolution, LTE)/LTE-Advanced (LTE-Advanced, LTE-A) system, and can also be used in other wireless communications systems, such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency-Division Multiple Access, SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (New Radio, NR) system is described for an illustrative purpose, and NR terms are used in most of the following descriptions. These technologies may also be applied to other applications than the NR system application, for example, to a 6th Generation (6th Generation, 6G) communications system.

Figure 1:
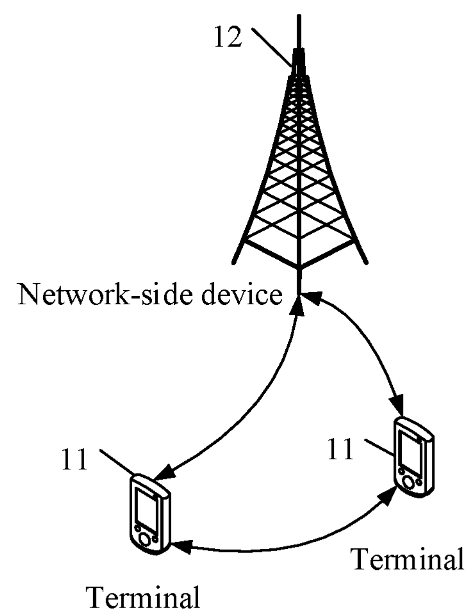
FIG. 1 is a structural diagram of a wireless communications system to which an embodiment of this application may be applied.

FIG. 1 is a structural diagram of a wireless communications system to which an embodiment of this application may be applied. The wireless communications system includes a terminal 11 and a network-side device 12. The terminal 11 may also be referred to as a terminal device or user equipment (User Equipment, UE). The terminal 11 may be a terminal-side device such as a mobile phone, a tablet personal computer (Tablet Computer), a laptop computer (Laptop Computer) or a notebook computer, a personal digital assistant (Personal Digital Assistant, PDA), a palmtop computer, a netbook, an ultra-mobile personal computer (ultra-mobile personal computer, UMPC), a mobile Internet device (Mobile Internet Device, MID), a wearable device (Wearable Device), a vehicular user equipment (VUE), or a pedestrian user equipment (PUE). The wearable device includes a smart watch, a smart band, an earphone, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (Base Transceiver Station, BTS), a radio base station, a radio transceiver, a basic service set (Basic Service Set, BSS), an extended service set (Extended Service Set, ESS), a NodeB, an evolved NodeB (eNB), a home NodeB, a home evolved NodeB, a wireless local area network (Wireless Local Area Networks, WLAN) access point, a Wireless Fidelity (Wireless Fidelity, Wi-Fi) node, a transmission and reception point (Transmitting Reception Point, TRP), or another appropriate term in the art, as long as the same technical effect is achieved. The base station is not limited to specific technical terms. It should be noted that in the embodiments of this application, only a base station in an NR system is used as an example, but a specific type of the base station is not limited.

First, related terms in the embodiments of this application are explained.

I. Multi Transmission and Reception Point (Transmission and Reception Point, TRP) Transmission Technology The current protocol has standardized a multi transmission and reception point or multi antenna panel (multi-TRP/multi-panel) scenario to improve transmission reliability and throughput performance. For example, user equipment can receive same data or different data from multiple TRPs. An ideal backhaul (ideal backhaul) and a non-ideal backhaul (non-ideal backhaul) exist between the multiple TRPs.

Figure 2:
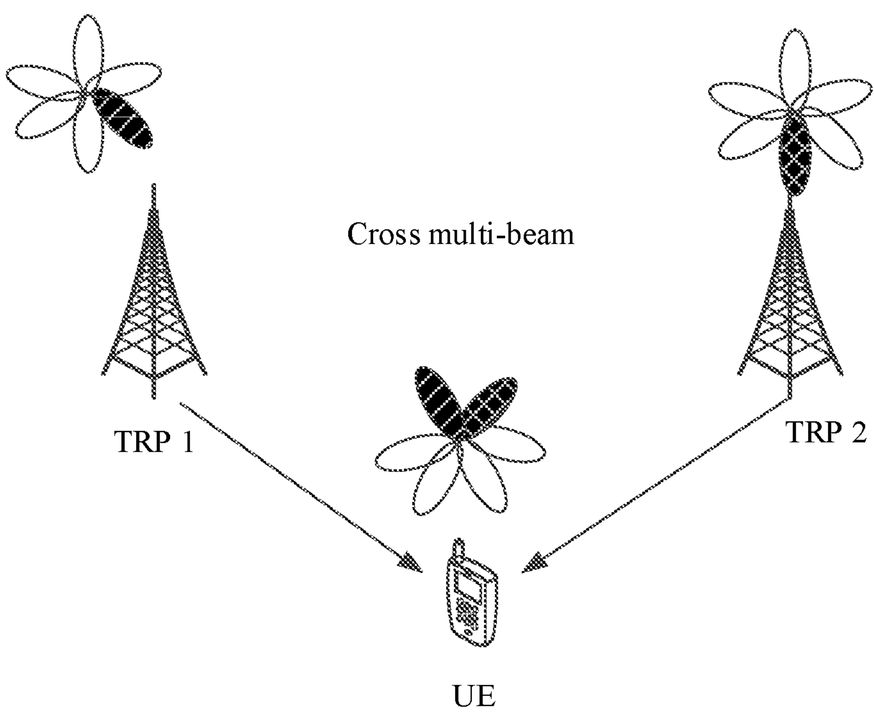
FIG. 2 is a schematic diagram of a multi-TRP transmission based on a non-ideal backhaul according to an embodiment of this application.

As shown in FIG. 2, when a non-ideal backhaul exists between the multiple TRPs, a high latency exists in information exchange between the multiple TRPs, independent scheduling is appropriate, and an acknowledgement (Acknowledgement, ACK) or negative acknowledgement (Negative Acknowledgement, NACK) and a channel state information report are reported to each TRP separately. Usually, this is applicable to multi-DCI scheduling. To be specific, each TRP transmits a physical downlink control channel (Physical Downlink Control Channel, PDCCH) of the TRP, each PDCCH schedules a physical downlink shared channel (Physical Downlink shared Channel, PDSCH) of the TRP, and multiple control resource sets (CORESET) configured for the UE are associated with different RRC parameters CORESETPoolIndex and correspond to different TRPs. Multiple PDSCHs scheduled by multiple DCIs may not overlap or may partially overlap or completely overlap on time-frequency resources. On overlapping time-frequency resources, each TRP performs independent precoding based on its own channel, and the UE receives multi-layer data streams of the multiple PDSCHs in a non-coherent joint transmission (non-coherent joint transmission, NCJT) mode.

Figure 3:
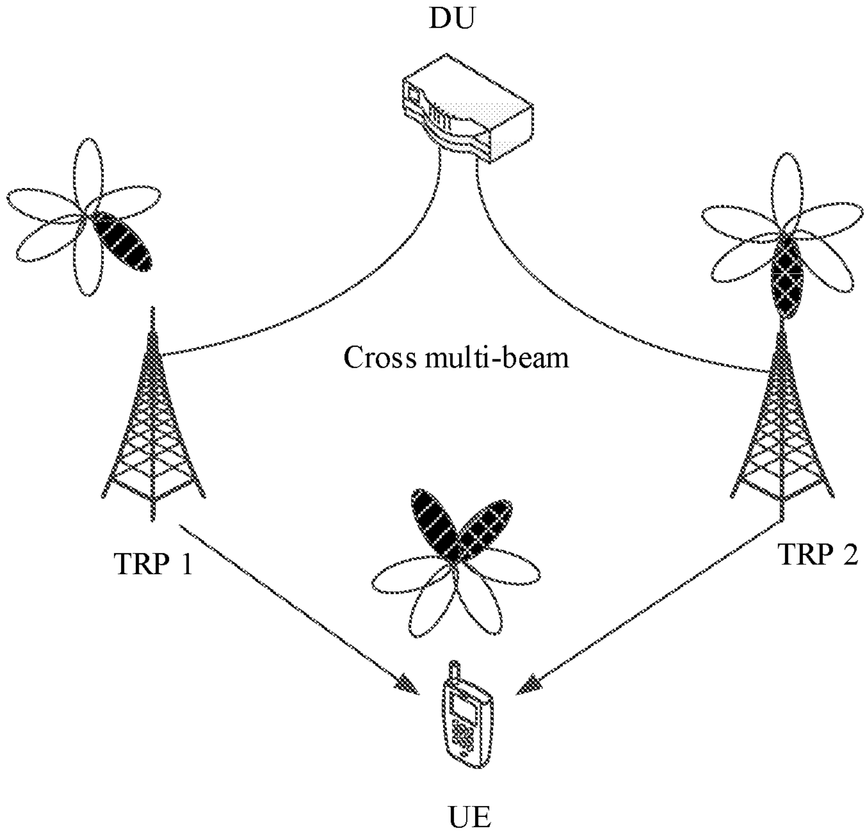
FIG. 3 is a schematic diagram of a multi-TRP transmission based on an ideal backhaul according to an embodiment of this application.

As shown in FIG. 3, when an ideal backhaul exists between the multiple TRPs, scheduling information and UE feedback information can be exchanged between the multiple TRPs in real time. Not only multiple PDSCHs can be scheduled by multiple pieces of downlink control information (Downlink Control Information, DCI), but also a PDSCH can be scheduled by a single DCI. The following transmission solutions are included:

Space division multiplexing (Space Division Multiplexing, SDM): Different data layers of a same transport block (Transport Block, TB) are transmitted from different TRPs through NCJT.

Frequency division multiplexing (Frequency Division Multiplexing, FDM): Different frequency domain resources to which a same redundancy version (Redundancy Version, RV) of a same TB is mapped are transmitted from different TRPs, or different RVs of a same TB are mapped to different frequency domain resources and transmitted from different TRPs.

Time division multiplexing (Time Division Multiplexing, TDM): Different RVs of a same TB are repeated from different TRPs for multiple times, for example, repeated in one slot, or repeated in multiple slots.

In this case, the ACK/NACK and CSI report may be reported to any TRP.

II. CSI Framework for a Single TRP

The CSI report may be configured as:

(1) periodic CSI report (P-CSI): transmitted only on a PUCCH;

(2) semi-persistent CSI report (SP-CSI): transmitted on a PUCCH or a PUSCH; or (3) aperiodic CSI report (A-CSI): transmitted only on a PUSCH.

A CSI resource setting (resource setting/CSI-ResourceConfig) is as follows:

(1) M≥1 resource settings (resource setting);

(2) one resource setting includes S≥1 CSI-RS resource sets (resource set);

(3) one resource set includes Ks≥1 RS resources (resource), for example, CSI-RS/CSI-IM resources; and (4) one CSI-RS resource is used to configure a quantity of ports and time-frequency location information of a CSI-RS, and the like; and a CSI-IM resource is used to configure time-frequency location information of CSI-IM, and the like.

III. Potential CSI Framework for Multiple TRPs

In an existing protocol, "multi-TRP or multi-panel" is specifically defined in terms of CSI report configuration, CSI resource configuration, and the like, specifically including the following settings:

(1) Multiple mutually associated CSI report settings (CSI-ReportConfig) are configured, and a resource setting (CSI-ResourceConfig) of each report setting (report setting) corresponds to one TRP, that is, each CSI report setting corresponds to a CSI report of one TRP.

(2) CSI reports of multiple TRPs are configured in one CSI report setting. Therefore, in one CSI report setting, the UE is required to measure CSI-RSs from different TRPs.

(2.1) Multiple groups of CSI resource settings (resource settings) are associated and correspond to different TRPs, each group of CSI resource settings includes one or more of CSI resource settings for channel measurement, interference measurement, and interference measurement of non-zero power CSI-RSs.

(2.2) One associated CSI resource setting includes S>1 (an existing protocol specifies a periodic or semi-persistent resource setting, and S=1) CSI resource sets (CSI measurement resource set), and each CSI resource set corresponds to a different TRP (with different QCL).

(2.3) One CSI resource set in an associated CSI resource setting includes multiple subsets, and each subset includes multiple CSI resources and corresponds to one TRP.

Currently, it has been agreed that CSI reports of multiple TRPs are configured in one CSI report setting, and the UE is required to measure CSI-RSs from different TRPs. However, there is no conclusion on whether the CSI-RSs from different TRPs are represented in a form of multiple CSI measurement resource sets or multiple subsets in one CSI measurement resource set.

IV Transmission Configuration Indication (Transmission Configuration Indication, TCI) State (State) Configuration of a CSI-RS (Reference Signal, RS)

In an existing protocol, a TCI state of a periodic CSI-RS is configured for each CSI-RS resource via RRC, and is indicated by a higher layer configuration parameter qcl-InfoPeriodicCSI-RS.

Figure 4:
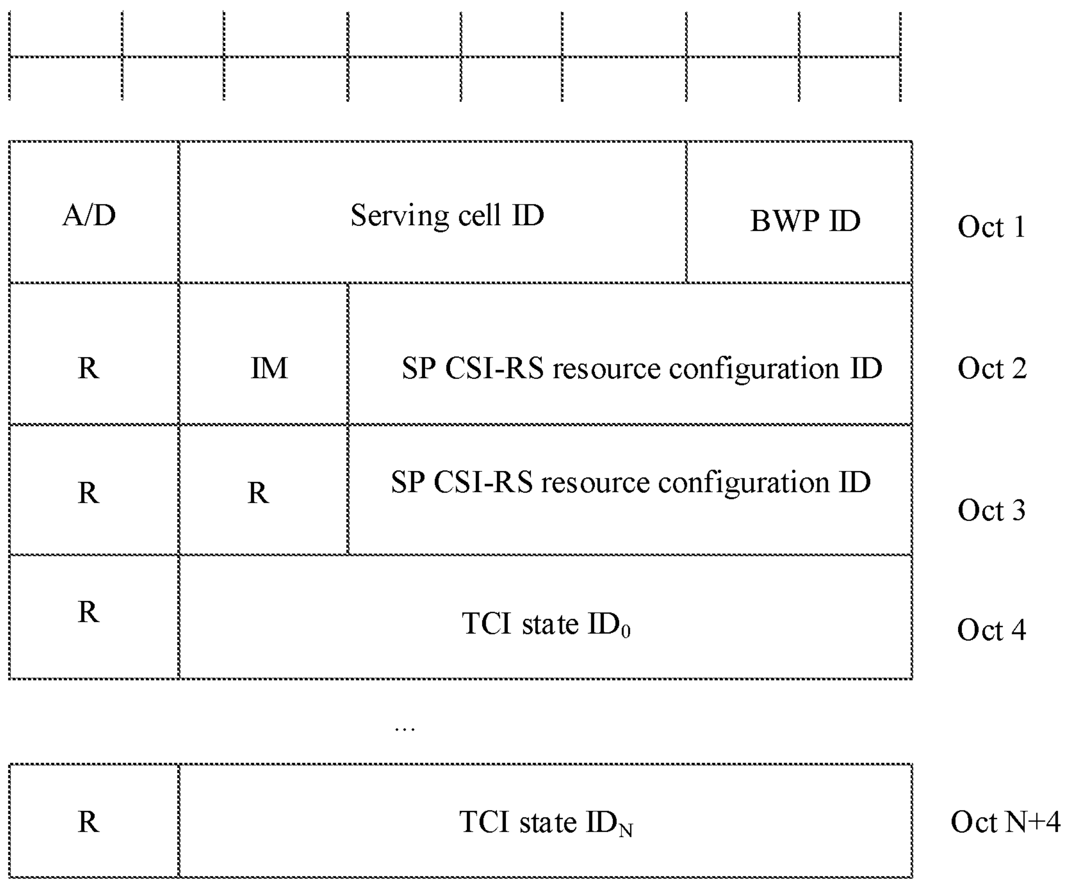
FIG. 4 is a schematic structural diagram of a MAC CE according to an embodiment of this application.

A semi-persistent CSI-RS is activated by a media access control (Media Access Control, MAC) control element (Control Element, CE) in a form of a CSI-RS resource set, and a TCI state of each semi-persistent CSI-RS in the set is also determined by the MAC CE. A specific format of the MAC CE is shown in FIG. 4.

An aperiodic CSI-RS is activated by DCI, and a Trigger-state field in the DCI is associated with multiple pieces of CSI report configuration information. The CSI report configuration information is configured via RRC. Each piece of CSI report configuration information includes a CSI report configuration identifier, a CSI-RS resource set identifier, and a TCI state set corresponding to CSI-RSs in the resource set. Therefore, the aperiodic CSI-RS and a TCI state corresponding to the aperiodic CSI-RS are selected and triggered by the DCI in a form of a CSI-RS resource set.

V. Default Quasi Co-Location (Quasi Co-Location, QCL) Hypothesis for an Aperiodic CSI-RS Transmission of the aperiodic CSI-RS is triggered by DCI. If a PDCCH carrying DCI including a csi_request field has a different TCI state from a first aperiodic CSI-RS in a CSI-RS resource set, the UE needs to switch between receive beams. Therefore, when a time interval between the last symbol of the PDCCH and the 1st symbol of the first aperiodic CSI-RS in the CSI-RS resource set triggered by the DCI is shorter than a time for the UE to switch between the beams, it is necessary to define a default QCL hypothesis for the aperiodic CSI-RS. A current protocol defines a default QCL hypothesis for an aperiodic CSI-RS in MTRP as follows:

(1) mDCI MTRP

1. When another downlink signal starts to be transmitted on a same symbol as the aperiodic CSI-RS, the aperiodic CSI-RS is received by using a QCL hypothesis of the downlink signal. The downlink signal may be any one of the following:

a PDSCH, where a PDCCH triggering the PDSCH and a PDCCH triggering the aperiodic CSI-RS correspond to a same CORESET Poolindex, and a scheduling time interval of the PDSCH is longer than timeDurationForQCL (time required for switching between receive beams of the PDCCH and the PDSCH, as reported by the UE);

another aperiodic CSI-RS, where a PDCCH triggering the another aperiodic CSI-RS and the PDCCH triggering the aperiodic CSI-RS correspond to the same CORESET Poolindex, and a scheduling time interval of the another aperiodic CSI-RS is longer than a time required for switching between the receive beams of the PDCCH and the another aperiodic CSI-RS;

a semi-persistent CSI-RS; and a periodic CSI-RS.

2. When the foregoing uplink signal does not exist, a QCL hypothesis associated with a CORESET with a smallest CORESET ID in a search space is a default QCL hypothesis for the aperiodic CSI-RS, and the CORESET needs to be associated with the same CORESETPoolindex as the PDCCH triggering the aperiodic CSI-RS.

(2) sDCI MTRP

1. When another downlink signal starts to be transmitted on a same symbol as the aperiodic CSI-RS, the aperiodic CSI-RS is received by using a QCL hypothesis of the downlink signal. The downlink signal may be any one of the following:

a PDSCH, where a scheduling time interval of the PDSCH is longer than timeDurationForQCL (time required for switching between receive beams of a PDCCH and the PDSCH, as reported by the UE), and if the PDSCH includes two TCI states, the aperiodic CSI-RS is received by using the first TCI state;

the aperiodic CSI-RS, where a scheduling time interval of the aperiodic CSI-RS is longer than a time required for switching between receive beams of the PDCCH and the aperiodic CSI-RS;

a semi-persistent CSI-RS; and a periodic CSI-RS.

2. When the foregoing uplink signal does not exist, the aperiodic CSI-RS is received by using the first one of TCI states of a lowest code point having two TCI states in a MAC CE, and the MAC CE is used to select a TCI state for the PDSCH in a same cell as receiving the aperiodic CSI-RS.

The following describes in detail a CSI measurement resource processing method provided in the embodiments of this application through some embodiments and application scenarios thereof with reference to the accompanying drawings.

Figure 5:
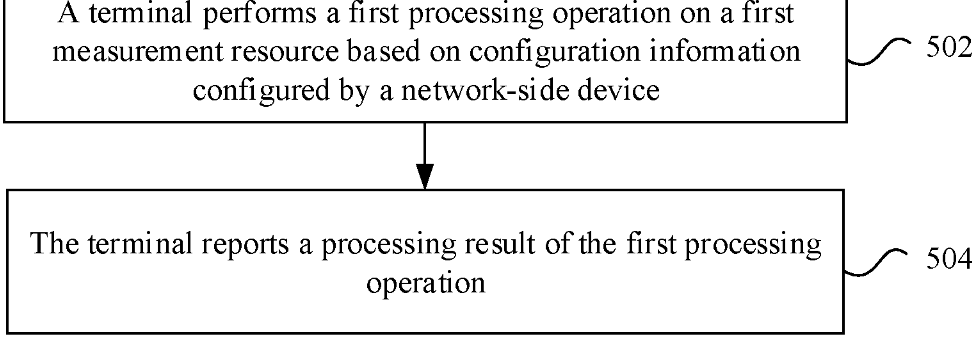
FIG. 5 is a flowchart of a CSI measurement resource processing method according to an embodiment of this application.

As shown in FIG. 5, an embodiment of this application provides a CSI measurement resource processing method. The method includes the following steps.

Step 502: A terminal performs a first processing operation on a first measurement resource based on configuration information configured by a network-side device.

Step 504: The terminal reports a processing result of the first processing operation.

The first measurement resource includes one or multiple CSI measurement resources, the configuration information includes an association relationship between the CSI measurement resources and multiple transmission and reception points TRPs or cells, and the first processing operation includes at least one of the following: channel measurement and interference measurement.

By performing step 502 and step 504, the terminal may perform the first processing operation on the CSI measurement resource based on the configuration information configured by the network-side device and including the association relationship between the CSI measurement resources and the multiple transmission and reception points TRPs or cells, and report the processing result of the first processing operation. Because the configuration information includes the association relationship between the CSI measurement resources and the multiple transmission and reception points TRPs or cells, the terminal can distinguish from which cell or which TRP the processing result comes, and report the processing result. In this way, a problem in the prior art that content reported by a terminal comes from a same cell because the terminal is unable to distinguish from which cell an SSB or a CSI-RS comes can be avoided. This not only facilitates high-speed data transmission of the terminal in carrier aggregation, but also improves reliability of data transmission during movement of the terminal.

In an optional implementation of this embodiment of this application, the TRPs are identified by at least one of the following: a control resource set pool index, an identifier of a CSI measurement resource set, and an identifier of a CSI measurement resource subset. It should be noted that in this case, the multiple CSI measurement resources are divided into one or multiple CSI measurement resource sets, and one CSI measurement resource set is divided into one or multiple CSI measurement resource subsets.

In addition, in this embodiment of this application, the cell may include at least one of the following: a serving cell and a non-serving cell, where a physical cell identifier (Physical Cell ID, PCI) corresponding to the serving cell is different from a PCI corresponding to the non-serving cell. It should be noted that PCIs are different between neighboring cells. Therefore, that a PCI corresponding to the serving cell is different from a PCI corresponding to the non-serving cell indicates that the non-serving cell is a neighboring cell of the serving cell. In other words, in this embodiment of this application, it is possible to distinguish whether the CSI measurement resources come from the serving cell or the non-serving cell, and then select measurement results corresponding to different cells for reporting. This not only facilitates high-speed data transmission of the terminal in carrier aggregation, but also improves reliability of data transmission during movement of the terminal.

Optionally, in this embodiment of this application, the association relationship may represent at least one of the following:

(1) in a case that the multiple CSI measurement resources are divided into multiple CSI measurement resource sets, the multiple CSI measurement resource sets correspond to the multiple TRPs or cells;

(2) in a case that the multiple CSI measurement resources are divided into one CSI measurement resource set and that the CSI measurement resource set includes multiple CSI measurement resource subsets, the multiple CSI measurement resource subsets correspond to the multiple TRPs or cells; and (3) each CSI measurement resource corresponds to one TRP or one cell.

It can be learned that, in this embodiment of this application, different association relationships not only facilitate high-speed data transmission of the terminal in carrier aggregation, but also improve reliability of data transmission during movement of the terminal.

In a specific implementation of this embodiment of this application, the association relationship in this embodiment of this application is described through an example in which CSI measurement resources are SSBs and an association relationship between the SSBs and non-serving cells (non-serving cell) is established.

When all SSBs are divided into multiple measurement resource sets or multiple subsets in one measurement resource set, and SSBs in one measurement resource set or subset are associated with one non-serving cell, a specific association relationship may be implemented as follows: in a higher layer configuration parameter of the measurement resource set or subset, using an existing field or adding one or more fields to indicate another PCI different from a PCI (physical cell identifier) of a current serving cell (serving cell) and related information.

When all SSBs are divided into one measurement resource set, and each SSB in the measurement resource set is associated with a corresponding non-serving cell, a specific association relationship may be implemented as follows: associating an SSB-Index with a corresponding non-serving cell, that is, adding one or more fields to a higher layer parameter SSB-Index to indicate another PCI different from a PCI of a current serving cell and related information.

In an optional implementation of this embodiment of this application, a manner in which the terminal reports a processing result of the first processing operation in step 504 may be further: the terminal reports the processing result via one or more CSI reports.

Further, the method in this embodiment of this application may further include:

Step 506: In a case that the processing result is at least one of a channel state information reference signal resource indicator (CSI-RS Resource Indicator, CRI) measurement value, a synchronization signal and physical broadcast channel block resource indicator (SSB Resource Indicator, SSBRI) measurement value, and a layer 1 measurement value, the terminal performs beam reporting based on at least one of a group-based beam reporting type and a non-group-based beam reporting type.

In an optional implementation of this embodiment of this application, the CSI measurement resource includes at least one of a channel measurement resource (Channel Measurement Resource, CMR) and an interference measurement resource (Interference Measurement Resource, IMR). The CMR includes at least one of a channel state information reference signal CSI-RS and a synchronization signal and physical broadcast channel block SSB.

In an optional implementation of this embodiment of this application, the configuration information in this embodiment of this application further includes at least one of the following: an identifier of the CSI measurement resource; and a quasi co-location QCL hypothesis for the CSI measurement resource.

Further, at least one of the following relationships exists between the CSI measurement resource and the QCL hypothesis:

(1) one CSI measurement resource corresponds to one QCL hypothesis;

(2) one CSI measurement resource set corresponds to one QCL hypothesis list, where the multiple CSI measurement resources are divided into multiple CSI measurement resource sets; and (3) one CSI measurement resource subset corresponds to one QCL hypothesis list, where the multiple CSI measurement resources are divided into one CSI measurement resource set, and the CSI measurement resource set is divided into multiple CSI measurement resource sub sets.

In an optional implementation of this embodiment of this application, the QCL hypothesis may be determined in at least one of the following manners: the QCL hypothesis is configured via a radio resource control RRC message; and the QCL hypothesis is configured via an RRC message and then determined by at least one of a media access control control element MAC CE and downlink control information DCI.

It should be noted that in this embodiment of this application, the first measurement resource overlaps a second measurement resource in time domain resource, where the first measurement resource and the second measurement resource correspond to different quasi co-locations type D QCLs Type D.

In addition, a time domain feature of the first measurement resource includes one of the following: periodic, semi-persistent, and aperiodic.

In an optional implementation of this embodiment of this application, the method in this embodiment of this application further includes:

Step 508: The terminal performs at least one of the following operations on the configuration information based on a MAC CE: update, addition, and deletion.

That the terminal updates the configuration information in step 508 includes at least one of the following:

(1) updating a QCL hypothesis for one or multiple CSI measurement resources;

(2) updating QCL hypotheses for all CSI measurement resources associated in a CSI measurement resource set, where the multiple CSI measurement resources are divided into multiple CSI measurement resource sets;

(3) updating QCL hypotheses for all CSI measurement resources associated in a CSI measurement resource subset, where the multiple CSI measurement resources are divided into one CSI measurement resource set, and the CSI measurement resource set is divided into multiple CSI measurement resource subsets;

(4) updating QCL hypotheses for all CSI measurement resources associated in a CSI resource setting; and (5) updating QCL hypotheses for all CSI measurement resources associated in a CSI report setting.

It should be noted that the MAC CE in this embodiment of this application includes at least one of the following:

(1) an ID of the CSI measurement resource and a QCL hypothesis corresponding to the CSI measurement resource;

(2) an ID of a target CSI measurement resource set and QCL hypotheses corresponding to all CSI measurement resources associated with the ID of the target CSI measurement resource set, where the QCL hypotheses corresponding to all the CSI measurement resources associated with the target CSI measurement resource set are indicated by multiple transmission configuration indication state TCI state IDs or one TCI state sequence ID;

(3) an ID of a target CSI measurement resource subset and QCL hypotheses corresponding to all CSI measurement resources associated with the ID of the target CSI measurement resource subset, where the QCL hypotheses corresponding to all the CSI measurement resources associated with the target CSI measurement resource subset are indicated by multiple transmission configuration indication state TCI state IDs or one TCI state sequence ID;

(4) an ID of a target CSI resource setting and QCL hypotheses corresponding to all CSI measurement resources associated with the ID of the target CSI resource setting, where the QCL hypotheses corresponding to all the CSI measurement resources associated with the target CSI resource setting are indicated by multiple TCI state IDs or one TCI state sequence ID; and (5) an ID of a target CSI report setting and QCL hypotheses corresponding to all CSI measurement resources associated with the ID of the target CSI report setting, where the QCL hypotheses corresponding to all the CSI measurement resources associated with the target CSI report setting are indicated by multiple TCI state IDs or one TCI state sequence ID.

In the prior art, a TCI state of a periodic CSI-RS is configured by a network side for each CSI-RS resource via RRC, and if the TCI state needs to be updated, the TCI state currently can only be reconfigured via RRC. An RRC reconfiguration period is long, signaling overheads are high, and the reconfiguration is inflexible. For an aperiodic CSI-RS, the network side configures multiple CSI-RS resource sets and multiple TCI state sequences via RRC, and indicates an aperiodic CSI-RS resource set and a TCI state sequence via DCI, and UE completes measurement of the aperiodic CSI-RS resource set based on the indicated TCI state sequence. In an MTRP scenario, CSI-RSs simultaneously measured by a terminal come from multiple TRPs, resulting in an increase of a quantity of combinations of TCI state pairs. Therefore, it is difficult to preconfigure various possible TCI state pairs via RRC. It can be learned that the foregoing problem exists in updating TCI states of the periodic CSI-RS and the aperiodic CSI-RS in the prior art. However, by performing the updating process in step 508 in this embodiment of this application, the QCL hypothesis for the CSI measurement resource can be updated using the MAC CE, for example, the TCI state of the CSI-RS can be updated, so that the terminal can adjust a receive beam more quickly and more flexibly, and that the TCI state of the CSI-RS can be updated conveniently while signaling overheads are reduced.

In an optional implementation of this embodiment of this application, the method in this embodiment of this application may further include:

Step 510: In a case that the CSI measurement resource is an aperiodic CSI-RS resource and that a first scheduling time interval is shorter than a beam switching time interval, the terminal determines a default QCL hypothesis based on a first preset rule.

Step 512: The terminal receives the aperiodic CSI-RS resource by using the default QCL hypothesis.

The first scheduling time interval is a quantity of symbols between the last symbol of a PDCCH triggering the aperiodic CSI-RS resource and the 1st symbol of the aperiodic CSI-RS resource, and the beam switching time interval is determined by a capability of the terminal.

A manner in which the terminal determines a default QCL hypothesis based on a first preset rule in step 510 may further include:

Step 512-11: In a case that the terminal receives a higher layer parameter physical downlink control channel configuration PDCCH-Config including multiple control resource set pool indexes and "enable default TCI state per control resource set pool index" enableDefaultTCIStatePerCoresetPoolIndex, the terminal associates the aperiodic CSI-RS resource with one control resource set pool index based on a second preset rule.

It should be noted that enableDefaultTCIStatePerCoresetPoolIndex means enabling each control resource set pool index to correspond to one default TCI state.

Step 512-12: The terminal determines that the default QCL hypothesis is at least one of the following:

a QCL hypothesis for a physical downlink shared channel PDSCH transmitted on a same symbol as the aperiodic CSI-RS resource, where a control resource set pool index corresponding to a physical downlink control channel PDCCH scheduling the PDSCH is the same as the control resource set pool index associated with the aperiodic CSI-RS resource, a second scheduling time interval is greater than a terminal capability of time duration for quasi co-location switching timeDurationForQCL, and the second scheduling time interval is a time interval between the last symbol of the PDCCH scheduling the PDSCH and the 1st symbol of the PDSCH;

a QCL hypothesis for an aperiodic CSI-RS transmitted on a same symbol as the aperiodic CSI-RS resource, where a control resource set pool index corresponding to the PDCCH triggering the aperiodic CSI-RS is the same as the control resource set pool index associated with the aperiodic CSI-RS resource, and the first scheduling time interval is greater than the terminal capability;

a QCL hypothesis for a semi-persistent CSI-RS resource transmitted on a same symbol as the aperiodic CSI-RS resource, where a control resource set pool index corresponding to a PDCCH activating the semi-persistent CSI-RS resource is the same as the control resource set pool index associated with the aperiodic CSI-RS resource;

a QCL hypothesis for a periodic CSI-RS resource transmitted on a same symbol as the aperiodic CSI-RS resource, where a control resource set pool index corresponding to the periodic CSI-RS resource in accordance with the second preset rule is the same as the control resource set pool index associated with the aperiodic CSI-RS resource; and a QCL hypothesis corresponding to a CORESET with a smallest CORESET ID in a search space, where a control resource set pool index corresponding to the CORESET is the same as the control resource set pool index associated with the aperiodic CSI-RS resource.

A manner in which the terminal determines a default QCL hypothesis based on a first preset rule in step 510 may further include:

Step 512-21: In a case that the terminal receives a higher layer parameter physical downlink control channel configuration PDCCH-Config including multiple control resource set pool indexes and "enable default TCI state per control resource set pool index" enableDefaultTCIStatePerCoresetPoolIndex, the terminal divides the aperiodic CSI measurement resource into multiple measurement resource sets or multiple measurement resource subsets, where the multiple CSI measurement resources are divided into one or multiple CSI measurement resource sets, and one CSI measurement resource set is divided into one or multiple CSI measurement resource subsets.

Step 512-22: The terminal maps the multiple resource sets or resource subsets to the multiple control resource set pool indexes based on a third preset rule.

The terminal determines that a QCL hypothesis for a CORESET with a smallest CORESET ID in a control resource set pool index corresponding to each CSI measurement resource set or CSI measurement resource subset is a default QCL hypothesis for the CSI measurement resource set or CSI measurement resource subset.

A manner in which the terminal determines a default QCL hypothesis based on a first preset rule in step 510 may further include:

Step 512-31: In a case that the terminal receives "enable two default TCI states" enableTwoDefaultTCIStates and that at least one TCI field corresponds to two TCI states, the terminal determines that the default QCL hypothesis is at least one of the following:

- a QCL hypothesis for a PDSCH transmitted on a same symbol as the aperiodic CSI-RS resource, where the PDSCH corresponds to two TCI states; and
- in a case that the aperiodic CSI measurement resource is divided into multiple CSI measurement resource sets or that the aperiodic CSI measurement resource is divided into multiple CSI measurement resource subsets in one CSI measurement resource set, using two TCI states of a lowest code point as a QCL hypothesis for the multiple measurement resource sets or the multiple measurement resource subsets.

In the prior art, under MTRP, when MTRP beam measurement or MTRP CSI measurement is implemented by using only one CSI report, that is, when aperiodic CSI-RS signals of multiple TRPs are activated by using a single DCI, and a scheduling time interval between a PDCCH and an aperiodic CSI-RS is less than a UE capability (reported beam switching time), a default QCL hypothesis defined in an existing protocol for the aperiodic CSI-RS is no longer applicable. For UE having multiple panels, a restriction on non-collision of CSI-RSs with different QCL hypotheses in time domain, defined in an existing protocol, may be canceled. Therefore, the default QCL hypothesis for the aperiodic CSI-RS needs to be redefined, especially in a case of mDCI.

By performing steps 510 and step 512 in this embodiment of this application, in a case that the first scheduling time interval is shorter than the beam switching time interval, the terminal determines the default QCL hypothesis based on the first preset rule, where the first scheduling time interval is the quantity of symbols between the last symbol of the PDCCH triggering the aperiodic CSI-RS resource and the first symbol of the aperiodic CSI-RS resource, and the beam switching time interval is determined by the terminal capability. In other words, in a case that the scheduling time interval between the PDCCH and the aperiodic CSI-RS is less than the UE capability, the default QCL hypothesis can be used.

The process of updating the QCL hypothesis using MAC CE is hereinafter described through an example.

Optional implementation 1: The MAC CE is used to update a QCL hypothesis for one or more CSI-RSs.

Figure 6:
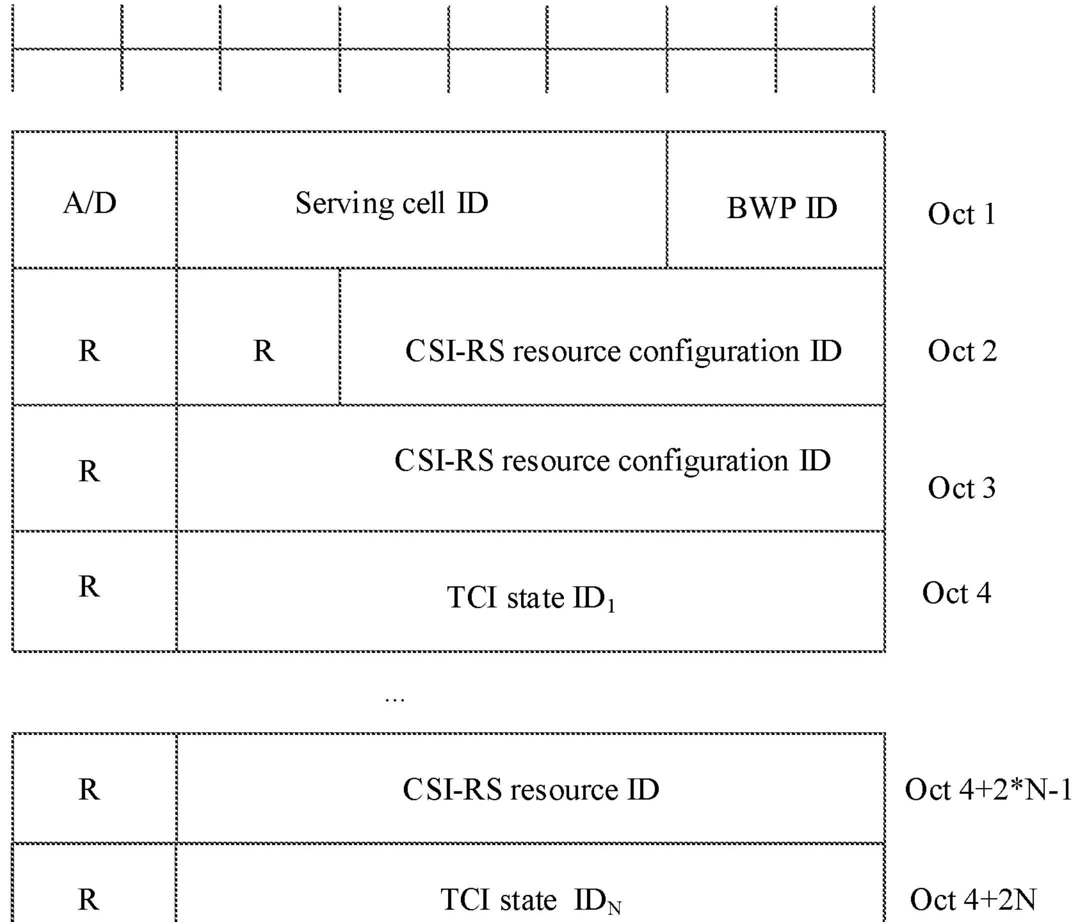
FIG. 6 is a schematic diagram of a MAC CE for updating a QCL hypothesis for one or more periodic CSI-RSs according to an embodiment of this application.

A format of the MAC CE for updating a QCL hypothesis for one or more periodic CSI-RSs is shown in FIG. 6: A serving cell ID is an identity of a current serving cell; a bandwidth part (Bandwidth Part, BWP) ID is an identifier of a downlink BWP for transmitting the MAC CE at a physical layer; a CSI-RS resource set ID is an identifier of a CSI-RS resource set in which the CSI-RS is located; a CSI-RS resource ID is an identifier of a CSI-RS resource; a TCI state ID is an updated TCI state identifier of the CSI-RS resource identified by the CSI-RS resource ID; and R is a reserved bit with a value of 0.

QCL hypotheses for the IMR and the CMR are the same. Therefore, after a QCL hypothesis for an $N^{th}$ NZP CSI-RS used for channel measurement is updated, a QCL hypothesis for a corresponding CSI-IM or NZP CSI-RS for interference measurement is also updated to the QCL hypothesis indicated in the MAC CE.

Optional implementation 2: The MAC CE is used to update a QCL hypothesis for one CSI-RS resource set.

Figures 7, 8:
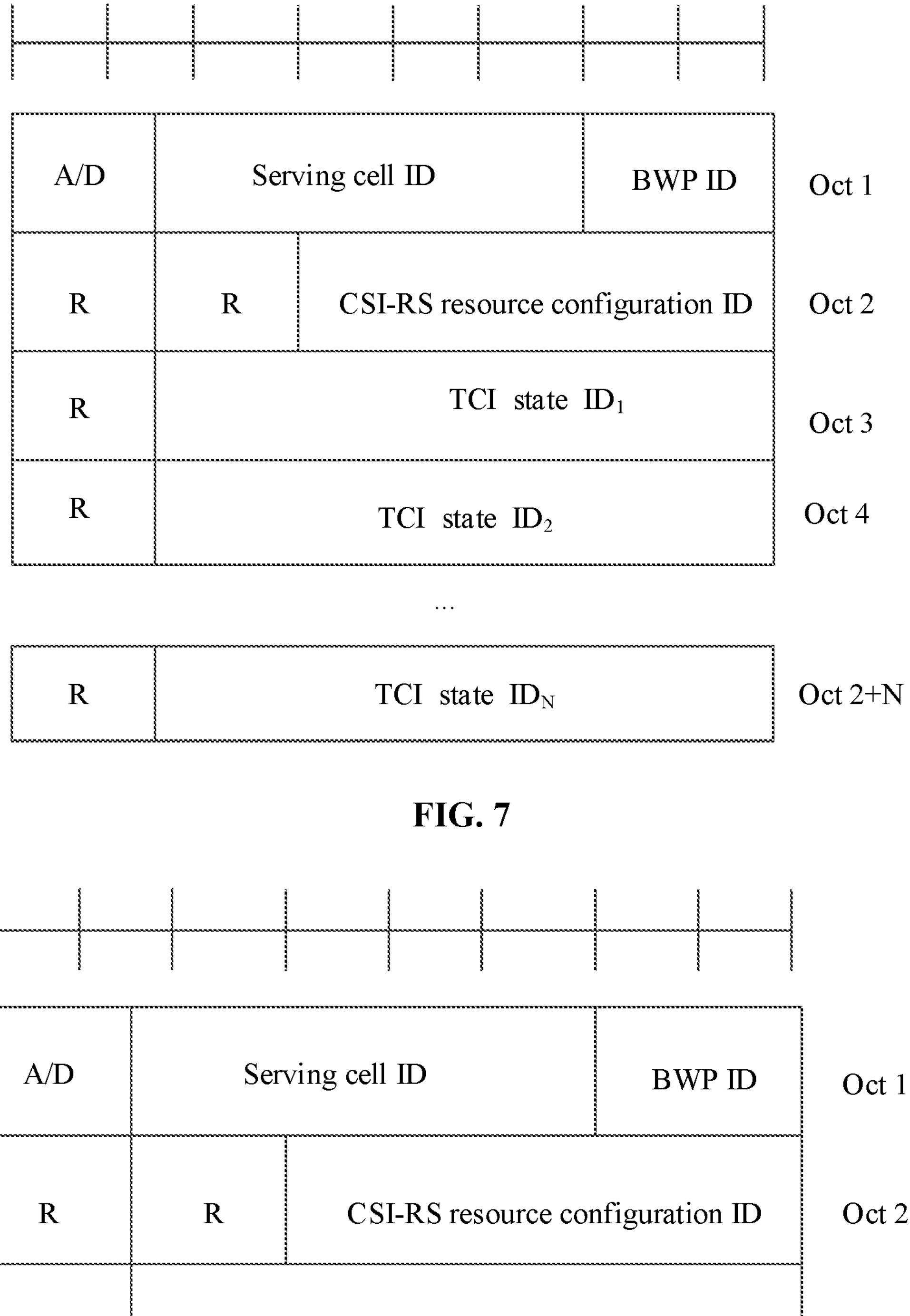
FIG. 7 is a schematic diagram of a MAC CE for updating a QCL hypothesis for one CSI-RS resource set according to an embodiment of this application.
FIG. 8 is a schematic diagram of a MAC CE for updating a QCL hypothesis sequence for one CSI-RS resource set according to an embodiment of this application.

Manner 1: A manner in which the MAC CE updates QCL hypotheses for all CSI-RS resources associated with a CSI-RS resource set ID is shown in FIG. 7, where the manner is applicable to updating of periodic and aperiodic CSI-RS resource sets.

Manner 2: Under a prerequisite that multiple TCI state lists are configured via RRC, only one TCI state list ID needs to be updated by updating a QCL hypothesis for a CSI-RS resource set using MAC CE, to indicate a list of new QCL hypotheses for all CSI-RS resources associated with one CSI-RS resource set ID, as shown in FIG. 8.

It should be noted that the manner 2 is applicable to updating of QCL hypotheses for both periodic and aperiodic CSI-RSs. When the manner 2 is applied to an aperiodic CSI-RS, if multiple TCI state lists are configured via RRC, qcl_info in a higher layer configuration parameter ReportConfigInfo may not correspond to one TCI state ID sequence, but may correspond to an identifier of only one TCI state list.

It should be noted that the CSI measurement resource processing method provided in this embodiment of this application may be performed by a CSI measurement resource processing apparatus, or a control module for performing the CSI measurement resource processing method in the CSI measurement resource processing apparatus. A CSI measurement resource processing apparatus provided in an embodiment of this application is described through an example in which the CSI measurement resource processing apparatus performs the CSI measurement resource processing method in this embodiment of this application.

Figure 9:
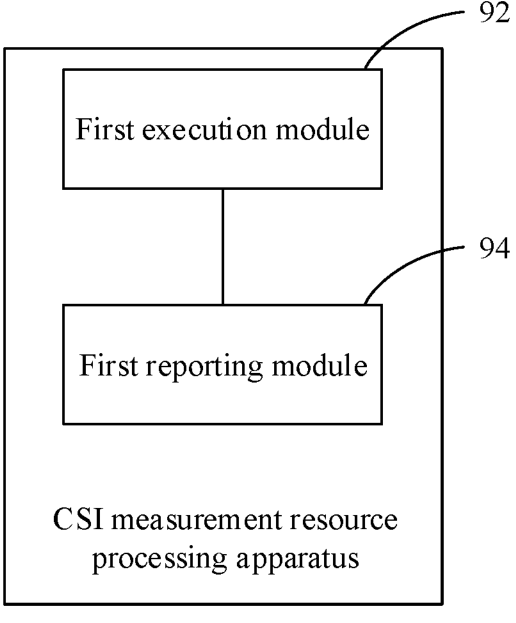
FIG. 9 is a schematic structural diagram of a CSI measurement resource processing apparatus according to an embodiment of this application.

As shown in FIG. 9, an embodiment of this application provides a CSI measurement resource processing apparatus, applied to a terminal. The apparatus includes:

- a first execution module 92, configured to perform a first processing operation on a first measurement resource based on configuration information configured by a network-side device; and
- a first reporting module 94, configured to report a processing result of the first processing operation, where
- the first measurement resource includes one or multiple CSI measurement resources, the configuration information includes an association relationship between the CSI measurement resources and multiple transmission and reception points TRPs or cells, and the first processing operation includes at least one of the following: channel measurement and interference measurement.

In this embodiment of this application, the apparatus may perform the first processing operation on the CSI measurement resource based on the configuration information configured by the network-side device and including the association relationship between the CSI measurement resources and the multiple transmission and reception points TRPs or cells, and report the processing result of the first processing operation. Because the configuration information includes the association relationship between the CSI measurement resources and the multiple transmission and reception points TRPs or cells, the terminal can distinguish from which cell or which of the multiple TRPs the processing result comes, and report the processing result. In this way, a problem in the prior art that content reported by a terminal comes from a same cell because the terminal is unable to distinguish from which cell an SSB or a CSI-RS comes can be avoided. This not only facilitates high-speed data transmission of the terminal in carrier aggregation, but also improves reliability of data transmission during movement of the terminal.

Optionally, in this embodiment of this application, the TRPs are identified by at least one of the following: a control resource set pool index, an identifier of a CSI measurement resource set, and an identifier of a CSI measurement resource subset, where the multiple CSI measurement resources are divided into one or multiple CSI measurement resource sets, and one CSI measurement resource set is divided into one or multiple CSI measurement resource subsets.

Optionally, in this embodiment of this application, the cell includes at least one of the following: a serving cell and a non-serving cell, where a physical cell identifier PCI corresponding to the serving cell is different from a PCI corresponding to the non-serving cell.

Optionally, in this embodiment of this application, the CSI measurement resource includes at least one of a channel measurement resource CMR and an interference measurement resource IMR.

Optionally, in this embodiment of this application, the CMR includes at least one of a channel state information reference signal CSI-RS and a synchronization signal and physical broadcast channel block SSB.

Optionally, in this embodiment of this application, the configuration information further includes at least one of the following: an identifier of the CSI measurement resource; and a quasi co-location QCL hypothesis for the CSI measurement resource.

Optionally, in this embodiment of this application, at least one of the following relationships exists between the CSI measurement resource and the QCL hypothesis:

- one CSI measurement resource corresponds to one QCL hypothesis;
- one CSI measurement resource set corresponds to one QCL hypothesis list, where the multiple CSI measurement resources are divided into multiple CSI measurement resource sets; and
- one CSI measurement resource subset corresponds to one QCL hypothesis list, where the multiple CSI measurement resources are divided into one CSI measurement resource set, and the CSI measurement resource set is divided into multiple CSI measurement resource subsets.

Optionally, in this embodiment of this application, the QCL hypothesis is determined in at least one of the following manners: being configured via a radio resource control RRC message; and being configured via an RRC message and then determined by at least one of a media access control control element MAC CE and downlink control information DCI.

Optionally, in this embodiment of this application, the first measurement resource overlaps a second measurement resource in time domain resource, where the first measurement resource and the second measurement resource correspond to different quasi co-locations type D QCLs Type D.

Optionally, in this embodiment of this application, a time domain feature of the first measurement resource includes one of the following: periodic, semi-persistent, and aperiodic.

Optionally, in this embodiment of this application, the association relationship represents at least one of the following:

- in a case that the multiple CSI measurement resources are divided into multiple CSI measurement resource sets, the multiple CSI measurement resource sets correspond to the multiple TRPs or cells;
- in a case that the multiple CSI measurement resources are divided into one CSI measurement resource set and that the CSI measurement resource set includes multiple CSI measurement resource subsets, the multiple CSI measurement resource subsets correspond to the multiple TRPs or cells; and
- each CSI measurement resource corresponds to one TRP or one cell.

Optionally, in this embodiment of this application, the first reporting module may further include: a reporting unit, configured to report the processing result via one or more CSI reports.

Optionally, in this embodiment of this application, the apparatus may further include: a second reporting module, configured for the terminal to perform beam reporting based on at least one of a group-based beam reporting type and a non-group-based beam reporting type in a case that the processing result is at least one of a CRI measurement value, an SSBRI measurement value, and a layer 1 measurement value.

Optionally, in this embodiment of this application, the apparatus may further include: a second execution module, configured to perform at least one of the following operations on the configuration information based on a MAC CE: update, addition, and deletion.

Optionally, in this embodiment of this application, the update operation performed by the second execution module includes at least one of the following:

- updating a QCL hypothesis for one or multiple CSI measurement resources;
- updating QCL hypotheses for all CSI measurement resources associated in a CSI measurement resource set, where the multiple CSI measurement resources are divided into multiple CSI measurement resource sets;
- updating QCL hypotheses for all CSI measurement resources associated in a CSI measurement resource subset, where the multiple CSI measurement resources are divided into one CSI measurement resource set, and the CSI measurement resource set is divided into multiple CSI measurement resource subsets;
- updating QCL hypotheses for all CSI measurement resources associated in a CSI resource setting; and
- updating QCL hypotheses for all CSI measurement resources associated in a CSI report setting.

Optionally, in this embodiment of this application, the MAC CE includes at least one of the following:

- an ID of the CSI measurement resource and a QCL hypothesis corresponding to the CSI measurement resource;
- an ID of a target CSI measurement resource set and QCL hypotheses corresponding to all CSI measurement resources associated with the ID of the target CSI measurement resource set, where the QCL hypotheses corresponding to all the CSI measurement resources associated with the target CSI measurement resource set are indicated by multiple transmission configuration indication state TCI state IDs or one TCI state sequence ID;
- an ID of a target CSI measurement resource subset and QCL hypotheses corresponding to all CSI measurement resources associated with the ID of the target CSI measurement resource subset, where the QCL hypotheses corresponding to all the CSI measurement resources associated with the target CSI measurement resource subset are indicated by multiple transmission configuration indication state TCI state IDs or one TCI state sequence ID;

an ID of a target CSI resource setting and QCL hypotheses corresponding to all CSI measurement resources associated with the ID of the target CSI resource setting, where the QCL hypotheses corresponding to all the CSI measurement resources associated with the target CSI resource setting are indicated by multiple TCI state IDs or one TCI state sequence ID; and an ID of a target CSI report setting and QCL hypotheses corresponding to all CSI measurement resources associated with the ID of the target CSI report setting, where the QCL hypotheses corresponding to all the CSI measurement resources associated with the target CSI report setting are indicated by multiple TCI state IDs or one TCI state sequence ID.

Optionally, in this embodiment of this application, the apparatus may further include:

a determining module, configured to determine a default QCL hypothesis based on a first preset rule in a case that the CSI measurement resource is an aperiodic CSI-RS resource and that a first scheduling time interval is shorter than a beam switching time interval; and a processing module, configured to receive the aperiodic CSI-RS resource by using the default QCL hypothesis, where the first scheduling time interval is a quantity of symbols between the last symbol of a PDCCH triggering the aperiodic CSI-RS resource and the 1st symbol of the aperiodic CSI-RS resource, and the beam switching time interval is determined by a capability of the terminal.

In this embodiment of this application, the determining module may further include:

an association unit, configured to associate the aperiodic CSI-RS resource with one control resource set pool index based on a second preset rule in a case that a higher layer parameter physical downlink control channel configuration PDCCH-Config including multiple control resource set pool indexes and "enable default TCI state per control resource set pool index" are received; and a first determining unit, configured to determine that the default QCL hypothesis is at least one of the following:

a QCL hypothesis for a physical downlink shared channel PDSCH transmitted on a same symbol as the aperiodic CSI-RS resource;

a QCL hypothesis for an aperiodic CSI-RS transmitted on a same symbol as the aperiodic CSI-RS resource;

a QCL hypothesis for a semi-persistent CSI-RS resource transmitted on a same symbol as the aperiodic CSI-RS resource;

a QCL hypothesis for a periodic CSI-RS resource transmitted on a same symbol as the aperiodic CSI-RS resource; and a QCL hypothesis corresponding to a CORESET with a smallest CORESET ID in a search space.

A control resource set pool index corresponding to a physical downlink control channel PDCCH scheduling the PDSCH is the same as the control resource set pool index associated with the aperiodic CSI-RS resource, a second scheduling time interval is greater than a terminal capability of time duration for quasi co-location switching, and the second scheduling time interval is a time interval between the last symbol of the PDCCH scheduling the PDSCH and the 1st symbol of the PDSCH;

a control resource set pool index corresponding to the PDCCH triggering the aperiodic CSI-RS is the same as the control resource set pool index associated with the aperiodic CSI-RS resource, and the first scheduling time interval is greater than the terminal capability;

a control resource set pool index corresponding to a PDCCH activating the semi-persistent CSI-RS resource is the same as the control resource set pool index associated with the aperiodic CSI-RS resource;

a control resource set pool index corresponding to the periodic CSI-RS resource in accordance with the second preset rule is the same as the control resource set pool index associated with the aperiodic CSI-RS resource; and a control resource set pool index corresponding to the CORESET is the same as the control resource set pool index associated with the aperiodic CSI-RS resource.

Optionally, in this embodiment of this application, the determining module may further include:

a division unit, configured to divide the aperiodic CSI measurement resource into multiple measurement resource sets or multiple measurement resource subsets in a case that a higher layer parameter physical downlink control channel configuration PDCCH-Config including multiple control resource set pool indexes and "enable default TCI state per control resource set pool index" are received, where the multiple CSI measurement resources are divided into one or multiple CSI measurement resource sets, and one CSI measurement resource set is divided into one or multiple CSI measurement resource subsets;

a processing unit, configured to map the multiple resource sets or resource subsets to the multiple control resource set pool indexes based on a third preset rule; and a second determining unit, configured to determine that a QCL hypothesis for a CORESET with a smallest CORESET ID in a control resource set pool index corresponding to each CSI measurement resource set or CSI measurement resource subset is a default QCL hypothesis for the CSI measurement resource set or CSI measurement resource subset.

In this embodiment of this application, the determining module may further include:

a third determining unit, configured to determine that the default QCL hypothesis is at least one of the following in a case that "enable two default TCI states" is received and that at least one TCI field corresponds to two TCI states:

a QCL hypothesis for a PDSCH transmitted on a same symbol as the aperiodic CSI-RS resource, where the PDSCH corresponds to two TCI states; and in a case that the aperiodic CSI measurement resource is divided into multiple CSI measurement resource sets or that the aperiodic CSI measurement resource is divided into multiple CSI measurement resource subsets in one CSI measurement resource set, using two TCI states of a lowest code point as a QCL hypothesis for the multiple measurement resource sets or the multiple measurement resource subsets.

The CSI measurement resource processing apparatus in this embodiment of this application may be an apparatus, an apparatus with an operating system, or an electronic device, or may be a component, an integrated circuit, or a chip in a terminal. The apparatus or the electronic device may be a mobile terminal, or may be a nonmobile terminal. For example, the mobile terminal may include but is not limited to the foregoing illustrated type of the terminal 11. The nonmobile terminal may be a server, a network attached storage (Network Attached Storage, NAS), a personal computer (personal computer, PC), a television (television, TV), a teller machine, a self-service machine, or the like. This is not specifically limited in this embodiment of this application.

The CSI measurement resource processing apparatus provided in this embodiment of this application can implement each process implemented by the method embodiment in FIG. 5, with the same technical effect achieved. To avoid repetition, details are not described herein again.

Figure 10:
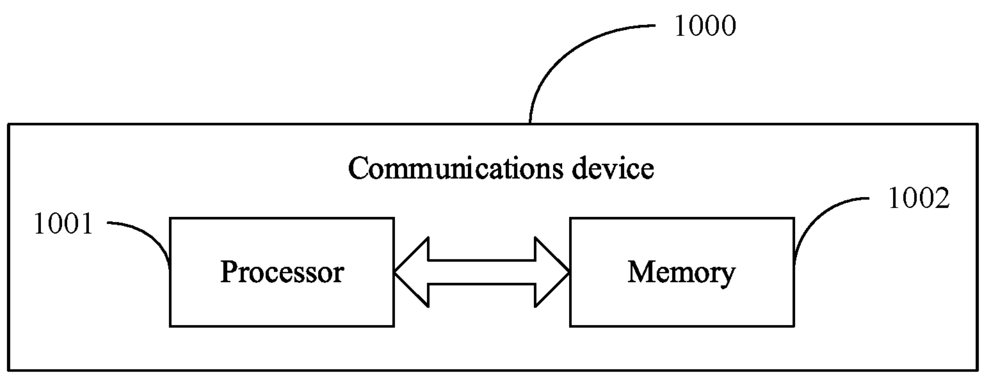
FIG. 10 is a schematic structural diagram of a communications device according to an embodiment of this application.

Optionally, as shown in FIG. 10, an embodiment of this application further provides a communications device 1000, including a processor 1001, a memory 1002, and a program or instructions stored in the memory 1002 and capable of running on the processor 1001. For example, when the communications device 1000 is a terminal, and the program or instructions are executed by the processor 1001, each process of the foregoing embodiment of the CSI measurement resource processing method is implemented, with the same technical effect achieved. When the communications device 1000 is a network-side device, and the program or instructions are executed by the processor 1001, each process of the foregoing embodiment of the CSI measurement resource processing method is implemented, with the same technical effect achieved. To avoid repetition, details are not described herein again.

Figure 11:
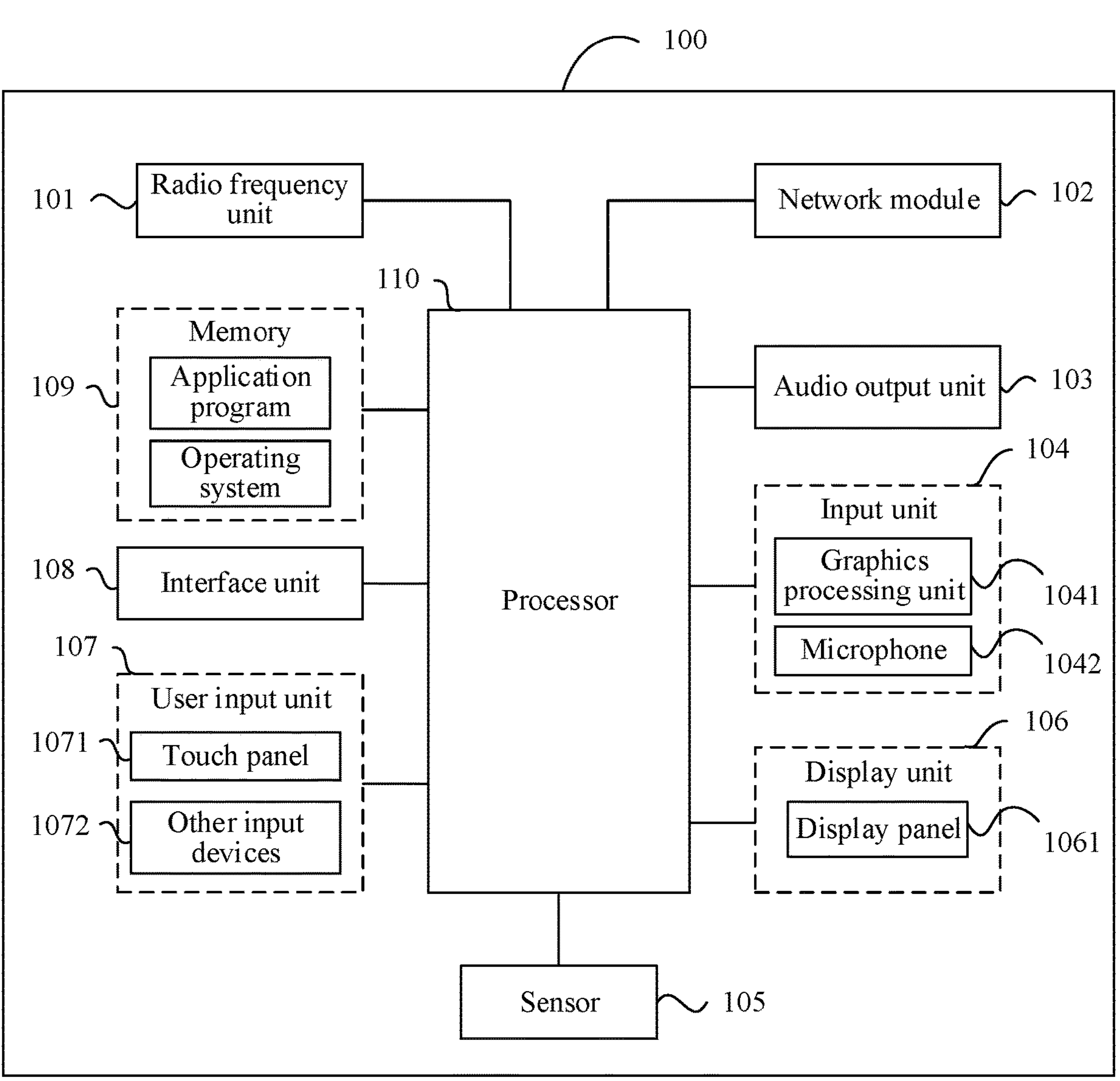
FIG. 11 is a schematic structural diagram of a terminal according to an embodiment of this application.

An embodiment of this application further provides a terminal. The terminal includes a processor and a communications interface. The processor is configured to perform a first processing operation on a first measurement resource based on configuration information configured by a network-side device. The communications interface is configured to report a processing result of the first processing operation. The terminal embodiment corresponds to the foregoing terminal-side method embodiment, and each implementation process and implementation of the foregoing method embodiment can be applied to the terminal embodiment, with the same technical effect achieved. Specifically, FIG. 11 is a schematic diagram of a hardware structure of a terminal for implementing an embodiment of this application.

The terminal 100 includes but is not limited to at least some components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the terminal 100 may further include a power supply (for example, a battery) supplying power to all components. Optionally, the power supply may be logically connected to the processor 110 through a power management system. In this way, functions such as charge management, discharge management, and power consumption management are implemented through the power management system. The terminal structure shown in FIG. 11 does not constitute a limitation on the terminal. The terminal may include more or fewer components than those shown in the figure, or some components are combined, or component arrangements are different. Details are not described herein again.

It should be understood that, in this embodiment of this application, the input unit 104 may include a graphics processing unit (Graphics Processing Unit, GPU) 1041 and a microphone 1042. The graphics processing unit 1041 processes image data of a still picture or video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function key (such as a volume control key or a switch key), a trackball, a mouse, and a joystick. Details are not described herein again.

In this embodiment of this application, after receiving downlink data from a network-side device, the radio frequency unit 101 sends the downlink data to the processor 110 for processing, and in addition, sends uplink data to the network-side device. Generally, the radio frequency unit 101 includes but is not limited to an antenna, at least one amplifier, a transceiver, a coupler, a low noise amplifier, a duplexer, and the like.

The memory 109 may be configured to store software programs or instructions and various data. The memory 109 may primarily include a program or instruction storage area and a data storage area. The program or instruction storage area may store an operating system, an application program or instructions (such as an audio play function and an image play function) required by at least one function, and the like. In addition, the memory 109 may include a high-speed random access memory, and may further include a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 110 may include one or more processing units. Optionally, the processor 110 may integrate an application processor and a modem processor. The application processor mainly processes the operating system, a user interface, an application program, or an instruction. The modem processor mainly processes wireless communication. For example, the modem processor is a baseband processor. It may be understood that the modem processor may alternatively be not integrated in the processor 110.

The processor 110 is configured to perform a first processing operation on a first measurement resource based on configuration information configured by a network-side device. The radio frequency unit 101 is configured to report a processing result of the first processing operation, where the first measurement resource includes one or multiple CSI measurement resources, the configuration information includes an association relationship between the CSI measurement resources and multiple transmission and reception points TRPs or cells, and the first processing operation includes at least one of the following: channel measurement and interference measurement.

In this embodiment of this application, the terminal may perform the first processing operation on the CSI measurement resource based on the configuration information configured by the network-side device and including the association relationship between the CSI measurement resources and the multiple transmission and reception points TRPs or cells, and report the processing result of the first processing operation. Because the configuration information includes the association relationship between the CSI measurement resources and the multiple transmission and reception points TRPs or cells, the terminal can distinguish from which cell or which of the multiple TRPs the processing result comes, and report the processing result. In this way, a problem in the prior art that content reported by a terminal comes from a same cell because the terminal is unable to distinguish from which cell an SSB or a CSI-RS comes can be avoided. This not only facilitates high-speed data transmission of the terminal in carrier aggregation, but also improves reliability of data transmission during movement of the terminal.

Optionally, the radio frequency unit 101 reports the processing result via one or more CSI reports.

Optionally, the processor 110 is configured to perform at least one of the following operations on the configuration information based on a MAC CE: update, addition, and deletion.

Optionally, that the processor 110 is configured to update the configuration information includes at least one of the following:

updating a QCL hypothesis for one or multiple CSI measurement resources;

updating QCL hypotheses for all CSI measurement resources associated in a CSI measurement resource set, where the multiple CSI measurement resources are divided into multiple CSI measurement resource sets;

updating QCL hypotheses for all CSI measurement resources associated in a CSI measurement resource subset, where the multiple CSI measurement resources are divided into one CSI measurement resource set, and the CSI measurement resource set is divided into multiple CSI measurement resource subsets;

updating QCL hypotheses for all CSI measurement resources associated in a CSI resource setting; and updating QCL hypotheses for all CSI measurement resources associated in a CSI report setting.

Optionally, the processor 110 is configured to: in a case that the CSI measurement resource is an aperiodic CSI-RS resource and that a first scheduling time interval is shorter than a beam switching time interval, determine a default QCL hypothesis based on a first preset rule; and receive the aperiodic CSI-RS resource by using the default QCL hypothesis.

Optionally, the processor 110 is configured to: in a case that a higher layer parameter physical downlink control channel configuration PDCCH-Config including multiple control resource set pool indexes and "enable default TCI state per control resource set pool index" are received, associate the aperiodic CSI-RS resource with one control resource set pool index based on a second preset rule; and determine that the default QCL hypothesis is at least one of the following:

a QCL hypothesis for a physical downlink shared channel PDSCH transmitted on a same symbol as the aperiodic CSI-RS resource;

a QCL hypothesis for an aperiodic CSI-RS transmitted on a same symbol as the aperiodic CSI-RS resource;

a QCL hypothesis for a semi-persistent CSI-RS resource transmitted on a same symbol as the aperiodic CSI-RS resource;

a QCL hypothesis for a periodic CSI-RS resource transmitted on a same symbol as the aperiodic CSI-RS resource; and a QCL hypothesis corresponding to a CORESET with a smallest CORESET ID in a search space.

Optionally, the processor 110 is configured to divide the aperiodic CSI measurement resource into multiple measurement resource sets or multiple measurement resource subsets in a case that a higher layer parameter physical downlink control channel configuration PDCCH-Config including multiple control resource set pool indexes and "enable default TCI state per control resource set pool index" are received, where the multiple CSI measurement resources are divided into one or multiple CSI measurement resource sets, and one CSI measurement resource set is divided into one or multiple CSI measurement resource subsets;

the processor 110 is further configured to map the multiple resource sets or resource subsets to the multiple control resource set pool indexes based on a third preset rule; and the processor 110 is further configured to determine that a QCL hypothesis for a CORESET with a smallest CORESET ID in a control resource set pool index corresponding to each CSI measurement resource set or CSI measurement resource subset is a default QCL hypothesis for the CSI measurement resource set or CSI measurement resource subset.

Optionally, the processor 110 is configured to determine that the default QCL hypothesis is at least one of the following in a case that "enable two default TCI states" is received and that at least one TCI field corresponds to two TCI states:

a QCL hypothesis for a PDSCH transmitted on a same symbol as the aperiodic CSI-RS resource, where the PDSCH corresponds to two TCI states; and in a case that the aperiodic CSI measurement resource is divided into multiple CSI measurement resource sets or that the aperiodic CSI measurement resource is divided into multiple CSI measurement resource subsets in one CSI measurement resource set, using two TCI states of a lowest code point as a QCL hypothesis for the multiple measurement resource sets or the multiple measurement resource subsets.

An embodiment of this application further provides a readable storage medium. The readable storage medium stores a program or instructions. When the program or instructions are executed by a processor, each process of the foregoing embodiment of the CSI measurement resource processing method is implemented, with the same technical effect achieved. To avoid repetition, details are not described herein again.

The processor is a processor in the terminal in the foregoing embodiment. The readable storage medium includes a computer-readable storage medium, for example, a computer read-only memory (Read-Only Memory, ROM), a random access memory (Random Access Memory, RAM), a magnetic disk, or an optical disc.

In addition, an embodiment of this application provides a chip. The chip includes a processor and a communications interface. The communications interface is coupled to the processor. The processor is configured to run a program or instructions to implement each process of the foregoing embodiment of the CSI measurement resource processing method, with the same technical effect achieved. To avoid repetition, details are not described herein again.

It should be understood that the chip provided in this embodiment of this application may also be referred to as a system-level chip, a system chip, a chip system, a system-on-chip, or the like.

In addition, an embodiment of this application provides a computer program product. The computer program product is stored in a storage medium. The computer program product is executed by at least one processor to implement each process of the foregoing embodiment of the CSI measurement resource processing method, with the same technical effect achieved. To avoid repetition, details are not described herein again.

An embodiment of this application further provides a communications device, configured to perform each process of the foregoing embodiment of the CSI measurement resource processing method, with the same technical effect achieved. To avoid repetition, details are not described herein again.

It should be noted that in this specification, the term "comprise", "include", or any variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by software in combination with a necessary general hardware platform, and certainly may alternatively be implemented by hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A channel state information (CSI) measurement resource processing method, comprising:

performing, by a terminal, a first processing operation on a first measurement resource based on configuration information configured by a network-side device; and reporting, by the terminal, a processing result of the first processing operation, wherein the first measurement resource comprises one or multiple CSI measurement resources, the configuration information comprises an association relationship between the CSI measurement resources and cells, and the first processing operation comprises at least one of the following: channel measurement and interference measurement; wherein the cell comprises a non-serving cell;

wherein the association relationship represents each CSI measurement resource corresponds to one cell.

2. The method according to claim 1, wherein a physical cell identifier (PCI) corresponding to the non-serving cell is different from a PCI corresponding to a serving cell.

3. The method according to claim 1, wherein the CSI measurement resource comprises at least one of a channel measurement resource (CMR) and an interference measurement resource (IMR).

4. The method according to claim 3, wherein the CMR comprises at least one of a channel state information reference signal (CSI-RS) and a synchronization signal and physical broadcast channel block (SSB).

5. The method according to claim 1, wherein the configuration information further comprises at least one of the following:

an identifier of the CSI measurement resource; and a quasi co-location (QCL) hypothesis for the CSI measurement resource.

6. The method according to claim 5, wherein at least one of the following relationships exists between the CSI measurement resource and the QCL hypothesis:

one CSI measurement resource corresponds to one QCL hypothesis;

one CSI measurement resource set corresponds to one QCL hypothesis list, wherein the multiple CSI measurement resources are divided into multiple CSI measurement resource sets; and one CSI measurement resource subset corresponds to one QCL hypothesis list, wherein the multiple CSI measurement resources are divided into one CSI measurement resource set, and the CSI measurement resource set is divided into multiple CSI measurement resource subsets.

7. The method according to claim 5, wherein the QCL hypothesis is determined in at least one of the following manners:

being configured via a radio resource control (RRC) message; and being configured via an RRC message and then determined by at least one of a media access control control element (MAC CE) and downlink control information (DCI).

8. The method according to claim 5, wherein the first measurement resource overlaps a second measurement resource in time domain resource, wherein the first measurement resource and the second measurement resource correspond to different quasi co-locations type D (QCLs Type D).

9. The method according to claim 5, wherein a time domain feature of the first measurement resource comprises one of the following: periodic, semi-persistent, and aperiodic.

10. The method according to claim 1, wherein the association relationship further represents at least one of the following:

in a case that the multiple CSI measurement resources are divided into multiple CSI measurement resource sets, the multiple CSI measurement resource sets correspond to the cells;

in a case that the multiple CSI measurement resources are divided into one CSI measurement resource set and that the CSI measurement resource set comprises multiple CSI measurement resource subsets, the multiple CSI measurement resource subsets correspond to the cells.

11. The method according to claim 10, wherein the reporting, by the terminal, a processing result of the first processing operation comprises:

reporting, by the terminal, the processing result via one or more CSI reports;

the method further comprises:

in a case that the processing result is at least one of a CSI-RS Resource Indicator (CRI) measurement value, an SSB Resource Indicator (SSBRI) measurement value, and a layer 1 measurement value, performing, by the terminal, beam reporting based on at least one of a group-based beam reporting type and a non-group-based beam reporting type.

12. The method according to claim 1, wherein the method further comprises:

performing, by the terminal, at least one of the following operations on the configuration information based on a MAC CE: update, addition, and deletion.

13. The method according to claim 12, wherein updating, by the terminal, the configuration information comprises at least one of the following:

updating a QCL hypothesis for one or multiple CSI measurement resources;

updating QCL hypotheses for all CSI measurement resources associated in a CSI measurement resource set, wherein the multiple CSI measurement resources are divided into multiple CSI measurement resource sets;

updating QCL hypotheses for all CSI measurement resources associated in a CSI measurement resource subset, wherein the multiple CSI measurement resources are divided into one CSI measurement resource set, and the CSI measurement resource set is divided into multiple CSI measurement resource subsets;

updating QCL hypotheses for all CSI measurement resources associated in a CSI resource setting; and updating QCL hypotheses for all CSI measurement resources associated in a CSI report setting.

14. The method according to claim 12, wherein the MAC CE comprises at least one of the following:

an ID of the CSI measurement resource and a QCL hypothesis corresponding to the CSI measurement resource;

an ID of a target CSI measurement resource subset and QCL hypotheses corresponding to all CSI measurement resources associated with the ID of the target CSI measurement resource subset;

an ID of a target CSI measurement resource set and QCL hypotheses corresponding to all CSI measurement resources associated with the ID of the target CSI measurement resource set;

an ID of a target CSI resource setting and QCL hypotheses corresponding to all CSI measurement resources associated with the ID of the target CSI resource setting; and an ID of a target CSI report setting and QCL hypotheses corresponding to all CSI measurement resources associated with the ID of the target CSI report setting;

wherein the QCL hypotheses corresponding to all the CSI measurement resources associated with the target CSI measurement resource set are indicated by multiple transmission configuration indication state (TCI) state IDs or one TCI state sequence ID;

the QCL hypotheses corresponding to all the CSI measurement resources associated with the target CSI measurement resource subset are indicated by multiple transmission configuration indication state TCI state IDs or one TCI state sequence ID;

the QCL hypotheses corresponding to all the CSI measurement resources associated with the target CSI resource setting are indicated by multiple TCI state IDs or one TCI state sequence ID; and the QCL hypotheses corresponding to all the CSI measurement resources associated with the target CSI report setting are indicated by multiple TCI state IDs or one TCI state sequence ID.

15. The method according to claim 1, wherein the method further comprises:

in a case that the CSI measurement resource is an aperiodic CSI-RS resource and that a first scheduling time interval is shorter than a beam switching time interval, determining, by the terminal, a default QCL hypothesis based on a first preset rule; and receiving, by the terminal, the aperiodic CSI-RS resource by using the default QCL hypothesis, wherein the first scheduling time interval is a quantity of symbols between the last symbol of a PDCCH triggering the aperiodic CSI-RS resource and the 1st symbol of the aperiodic CSI-RS resource, and the beam switching time interval is determined by a capability of the terminal.

16. A terminal, comprising a processor, a memory, and a program or instructions stored in the memory and capable of running on the processor, wherein when the program or instructions are executed by the processor, the following steps are performed:

performing, by a terminal, a first processing operation on a first measurement resource based on configuration information configured by a network-side device; and reporting, by the terminal, a processing result of the first processing operation, wherein the first measurement resource comprises one or multiple CSI measurement resources, the configuration information comprises an association relationship between the CSI measurement resources and cells, and the first processing operation comprises at least one of the following: channel measurement and interference measurement;

wherein the cell comprises a non-serving cell;

wherein the association relationship represents each CSI measurement resource corresponds to one cell.

17. The terminal according to claim 16, wherein the association relationship further represents at least one of the following:

in a case that the multiple CSI measurement resources are divided into multiple CSI measurement resource sets, the multiple CSI measurement resource sets correspond to the cells;

in a case that the multiple CSI measurement resources are divided into one CSI measurement resource set and that the CSI measurement resource set comprises multiple CSI measurement resource subsets, the multiple CSI measurement resource subsets correspond to the cells.

18. The terminal according to claim 16, wherein the CSI measurement resource comprises at least one of a channel measurement resource (CMR) and an interference measurement resource (IMR).

19. The terminal according to claim 18, wherein the CMR comprises at least one of a channel state information reference signal (CSI-RS) and a synchronization signal and physical broadcast channel block (SSB).

20. A non-transitory readable storage medium, wherein the readable storage medium stores a program or instructions, and when the program or instructions are executed by a processor, the following steps are performed:

performing, by a terminal, a first processing operation on a first measurement resource based on configuration information configured by a network-side device; and reporting, by the terminal, a processing result of the first processing operation, wherein the first measurement resource comprises one or multiple CSI measurement resources, the configuration information comprises an association relationship between the CSI measurement resources and cells, and the first processing operation comprises at least one of the following: channel measurement and interference measurement;

wherein the cell comprises a non-serving cell;

wherein the association relationship represents each CSI measurement resource corresponds to one cell.

* * * * *